United States Patent [19]

Murai

[11] Patent Number: 4,936,222

[45] Date of Patent: Jun. 26, 1990

[54] CONVEYING APPARATUS HAVING L-SHAPED HANGER

[75] Inventor: Masasumi Murai, Tokorozawa, Japan

[73] Assignee: Tsubakimoto Chain Co., Osaka, Japan

[21] Appl. No.: 273,196

[22] Filed: Nov. 18, 1988

[30] Foreign Application Priority Data

Nov. 20, 1987 [JP] Japan ................................ 62-292146

[51] Int. Cl.⁵ .................. B61B 3/00; B61D 49/00; B61D 13/04
[52] U.S. Cl. .................................... 104/89; 104/133; 104/172.4; 105/148
[58] Field of Search ............... 104/89, 119, 133, 172.4; 105/148, 149; 198/680; 118/428, 500; 34/216, 217, 243 C, 236

[56] References Cited

U.S. PATENT DOCUMENTS

| 4,064,639 | 12/1977 | Pels-Leusden et al. | 34/216 |
| 4,462,315 | 7/1984 | Wakabayashi | 105/148 X |
| 4,557,373 | 6/1985 | Paurat et al. | 104/89 X |
| 4,561,358 | 12/1985 | Burgess | 104/89 |

FOREIGN PATENT DOCUMENTS 3336857 4/1985 Fed. Rep. of Germany ...... 105/148

Primary Examiner—Robert J. Oberleitner
Attorney, Agent, or Firm—Flynn, Thiel, Boutell & Tanis

[57] ABSTRACT

A conveying apparatus having an overhead conveyor; a L-shaped hanger suspended from the overhead conveyor, a load supporting portion of the hanger being located sidewardly of the conveyor; a guide roller provided on the load supporting portion; and a guide rail for guiding the roller. The L-shaped hanger may be suspended through a C-shaped fitting, the opening of the C shape facing toward the load supporting portion of the hanger; and a foreign matter shield may be provided having both a horizontal plate member projecting into the opening of the C shape and an upright plate member.

18 Claims, 10 Drawing Sheets ously downwardly, the load 35

CONVEYING APPARATUS HAVING L-SHAPED HANGER

FIELD OF THE INVENTION

This invention relates to a conveying apparatus having L-shaped hangers for use, for example, in an automotive assembly line.

BACKGROUND OF THE INVENTION

A conventional suspension conveying apparatus having L-shaped hangers in which foreign matter, such as oil, worn particles, etc., may be prevented from falling upon the conveyed articles as shown in FIG. 1. The article carrying portion 3 of a L-shaped hanger 2 which is suspended from an overhead conveyor 1 is situated sideward of the conveyor 1 with a partition plate 4 therebetween for preventing foreign matter from scattering onto the conveyed article A. The momental force due to the conveyed article A acts upon the L-shaped hanger 2 so that a roller 5, which is adapted to roll against a guide rail 8 to resist the momental force, is mounted to the frame 6 attached to the vertical portion 3' of the hanger 2 with a reinforcing bracket 7 therebetween.

In the above-mentioned prior art, the distance between the guide roller 5 and the center of the tilting motion is relatively large, and consequently, the momental force acting upon the frame 6 becomes significantly large due to the substantial weight of the conveyed article, such as an automotive body. Thus, a reinforcing structure, such as the bracket 7, is required, which increases the total weight of the hanger 2. Moreover, since the reaction force of the guide roller 5 against the rail 8 acts vertically downwardly, the load acting upon the carrier rail of the overhead conveyor substantially correspondingly increases. Thus, the load acting upon the overhead conveyor increases correspondingly, which necessitates an increase in the strength of the component parts of the overhead conveyor, which in turn requires larger driving force of the conveyor.

Furthermore, although the partition plate 4 may be able to prevent foreign matter from falling onto the automotive body A, it cannot prevent foreign matter from falling straight downwardly of the conveyor. Therefore, in cases where the automotive bodies are coated by electrode-position, there is a drawback that oil, dusts, etc., are likely to fall into and contaminate the processing bath in which the bodies are conveyed for pre-treatment.

SUMMARY OF THE INVENTION

The present invention is firstly: a conveying apparatus having a L-shaped hanger comprising an overhead conveyor; a L-shaped hanger suspended from said overhead conveyor, the load supporting portion of said hanger being located sideward of said conveyor; a guide roller provided on said load supporting portion; and a guide rail for guiding said roller.

Owing to the above structure, the load acting upon the overhead conveyor may be reduced, thereby making it possible to simplify the whole structure of the conveying apparatus as well as to reduce the total weight of the apparatus.

The L-shaped hanger may be suspended through a C-shaped fitting, the opening of said C shape facing toward the load supporting portion of said hanger; and a foreign matter shielding means may be provided having both a horizontal plate member projecting into the opening of said C shape and an upright plate member. Such a shielding means can effectively prevent foreign matter, such as dust, oil, etc., caused by the overhead conveyor from entering the processing bath.

Alternatively, the guide roller may be provided immediately below the vertical portion of said hanger.

Furthermore, guide rollers may also be provided at substantially the same height as the point of suspension of said hanger.

The conveying apparatus of the present invention is particularly effective where it is necessary to separate the conveying apparatus from a severe atmosphere, such as when drying, coating, flushing, etc., of automotive bodies.

DETAILED DESCRIPTION

Figure 2:
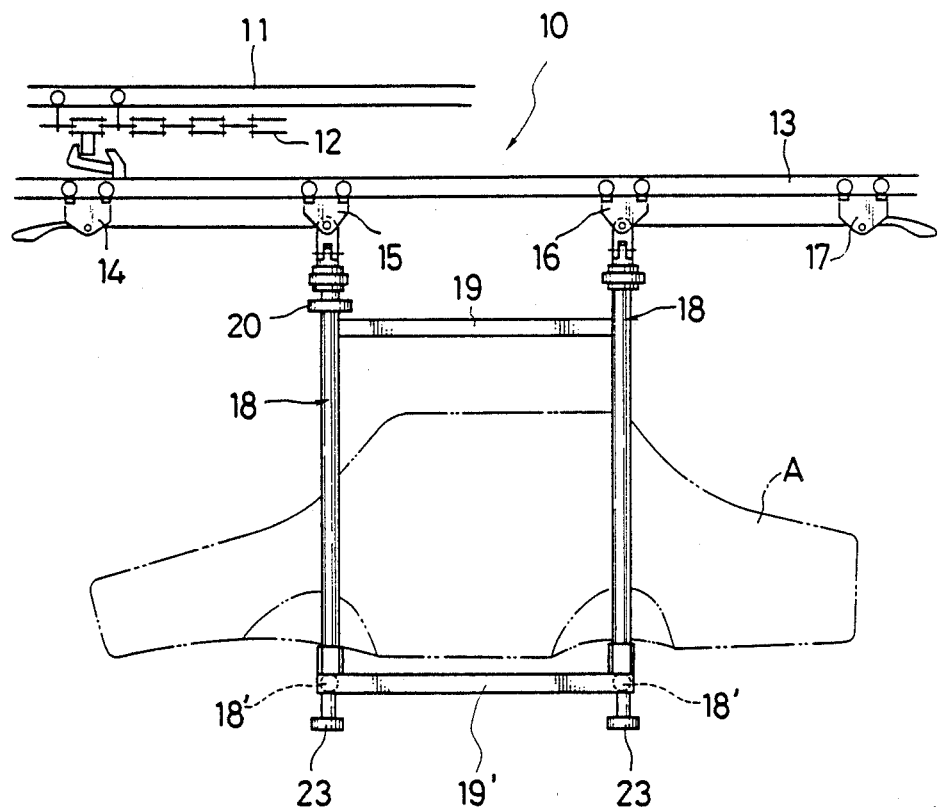
FIG. 2 is a front view of a first embodiment of this invention.
Figure 3:
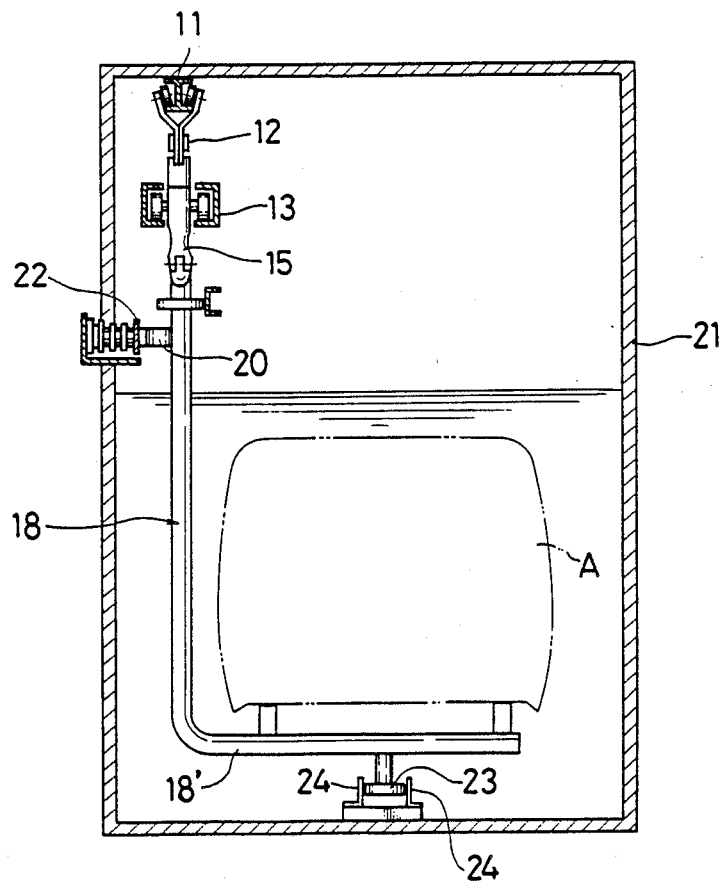
FIG. 3 is a side view of the FIG. 2 embodiment wherein an automotive body is conveyed in a processing bath.
Figure 5:
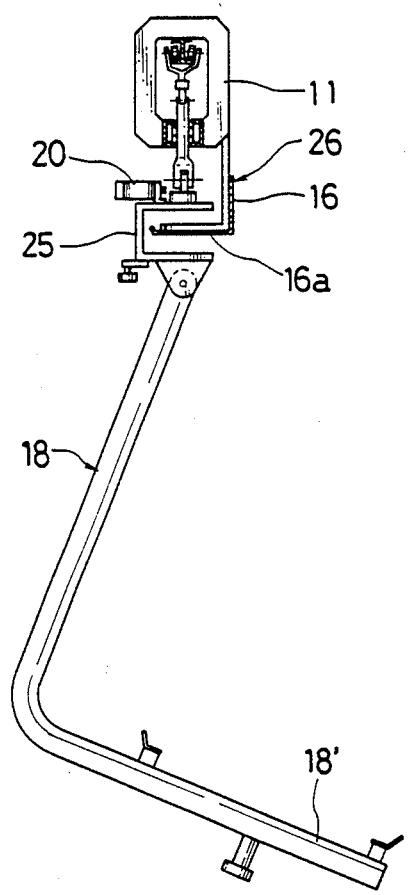
FIG. 5 is a side view showing the hanger of FIG. 4 with no conveyed article thereon.

FIG. 2 is a side view of the first embodiment of the present invention, and FIG. 3 is a front view thereof depicting an automotive body being conveyed in a bath. A duplex overhead conveyor 10 comprises a power rail 11, a driving chain 12 adapted to be movably guided along the rail 11, a front-most front trolley 14, a rear-most front trolley 15, a front-most rear trolley 16 and a rear-most rear trolley 17 adapted to be driven by the driving chain 12 and guided by a free rail 13. A pair of L-shaped hangers 18,18 are mounted to the trolleys 15,16 respectively such that the hangers may swing both longitudinally and sidewardly relative to the elongate direction of the conveyor as explained later. The L-shaped hangers 18,18 are connected by an upper horizontal bar 19 and a lower horizontal bar 19'. The load supporting portions or arms 18',18' of the hangers 18,18 project generally horizontally and are located sidewardly of the overhead conveyor 10 and support a conveyed article A, such as an automotive body. Since the L-shaped hangers 18,18 may swing longitudinally, the conveying path may be inclined relative to the horizontal. And since the hangers may swing sidewardly, the hangers may be allowed to be tilted as shown in FIG. 5 due to their own weight, as when conveyance of automotive bodies is not necessary, thus saving sideward space for carrying empty hangers.

A collector 20 is adapted to slide against a feeding rail 22 provided o n a wall of a tank 21 when an automotive body A is submerged in the pre-treatment tank 21 as shown in FIG. 3.

A guide roller 23 is provided on the respective load supporting potions 18' of the L-shaped hangers 18, said rollers 23 being guided by a guide rail 24 disposed along the conveying path of the article A to prevent the hangers from tilting. The guide rail 24 is to restrain only the sideward movement of the guide rollers 23, and there is no need to restrain the vertical movement of the rollers 23.

Figure 4:
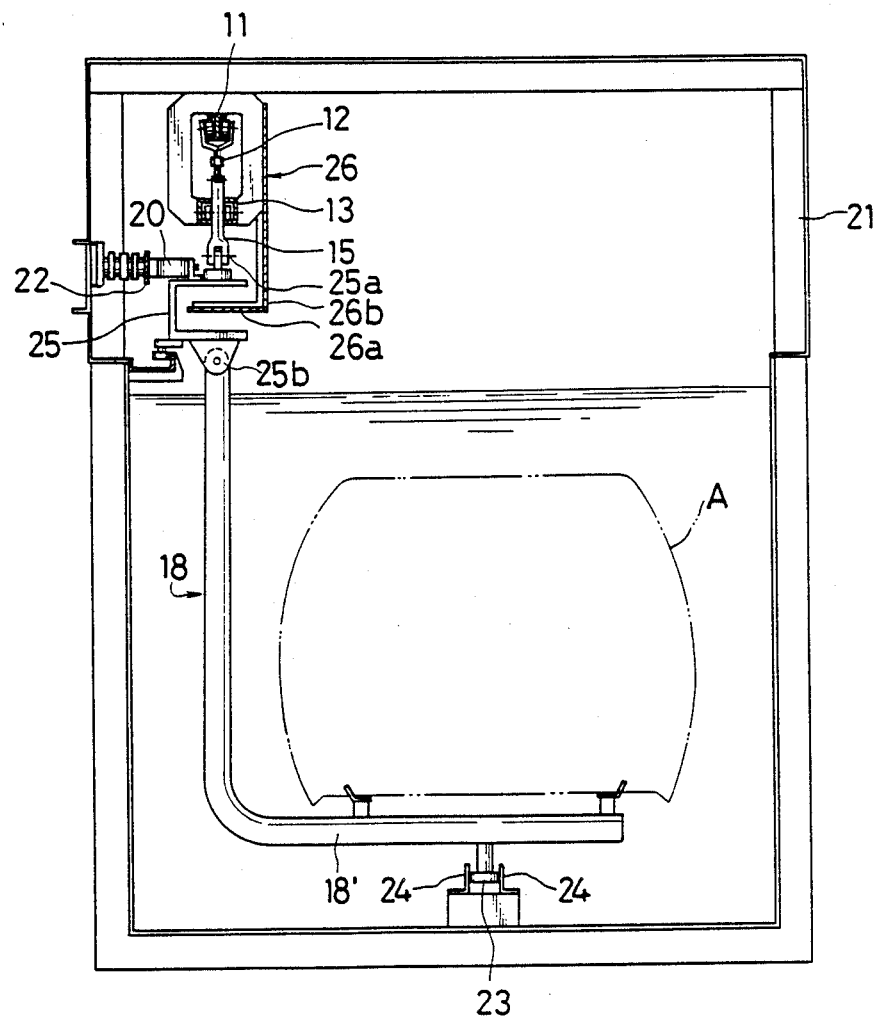
FIG. 4 is a side view similar to FIG. 3 showing another embodiment.

FIG. 4 shows the second embodiment of this invention in a view similar to FIG. 3. The same reference numerals denote the same or similar component parts as before.

The L-shaped hanger 18 is suspended from the overhead conveyor 10 through a C-shaped fitting 25 such that it can swing both longitudinally and sidewardly. A first (upper) hinge-type coupling 25a connects between the trolley 15,16 and the fitting 25 for permitting longitudinal swinging of the hanger, and a second (lower) hinge-type coupling 25b connects between the fitting 25 and the hanger for permitting sideward swinging of the hanger. The fitting 25 opens sidewardly toward the load supporting portion 18' of the L-shaped hanger 18.

A foreign matter shielding means 26 comprises a horizontal plate member 26a and an upright plate member 26b. The opening of the fitting 25 accommodates the horizontal plate member 26a, whereas the upright plate 26a projects upwardly along the side of the conveyor.

Foreign matter, such as oil, worn particles, dust, etc., which may drop from the overhead conveyor may be deposited on the horizontal plate member 26a so that they will not enter the solution contained in the tank 21; and the possible sideward scattering of such foreign matter can be prevented by the upright plate member 26b so that they will likewise not contaminate the solution.

The guide roller 23 may be provided at any desired position of the load supporting portion 18'; however, it goes without saying that the larger the distance between the guide roller and the center of the pivotal motion of the hanger, the smaller is the load acting upon the roller due to the tilting moment.

The L-shaped hanger 18 is capable of swinging transversely as shown in FIG. 5. Thus, in those sections where no conveyance of automotive bodies is necessary, by eliminating the rail 24, the hanger may be tilted so that the sideward space required for the conveyance of the empty hangers may be substantially minimized.

Figure 6:
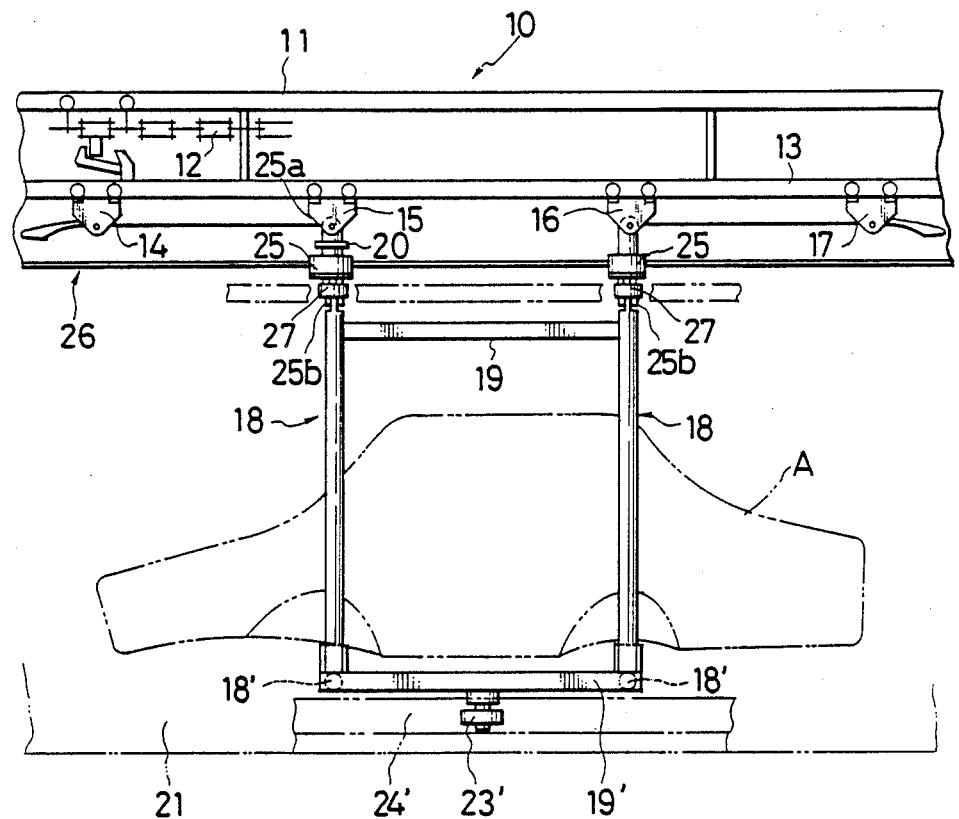
FIG. 6 is a front view similar to FIG. 2 but showing a further embodiment.
Figure 7:
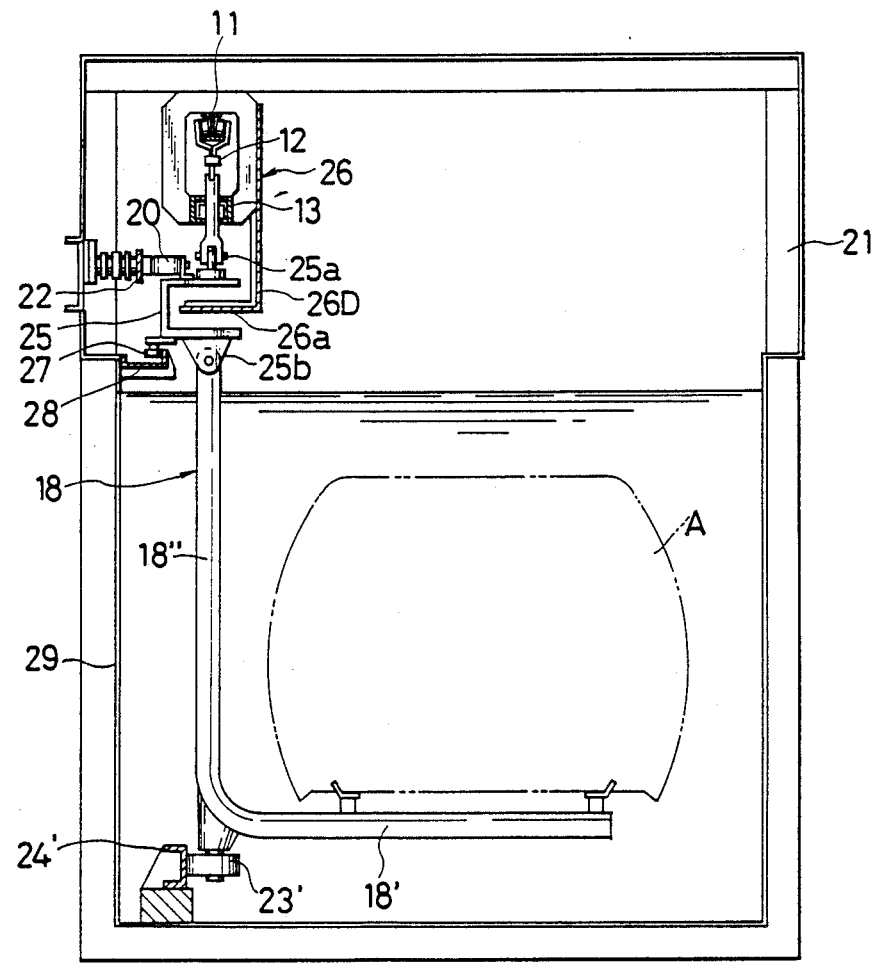
FIG. 7 is a side view similar to FIG. 3 but of the embodiment of FIG. 6.
Figure 8:
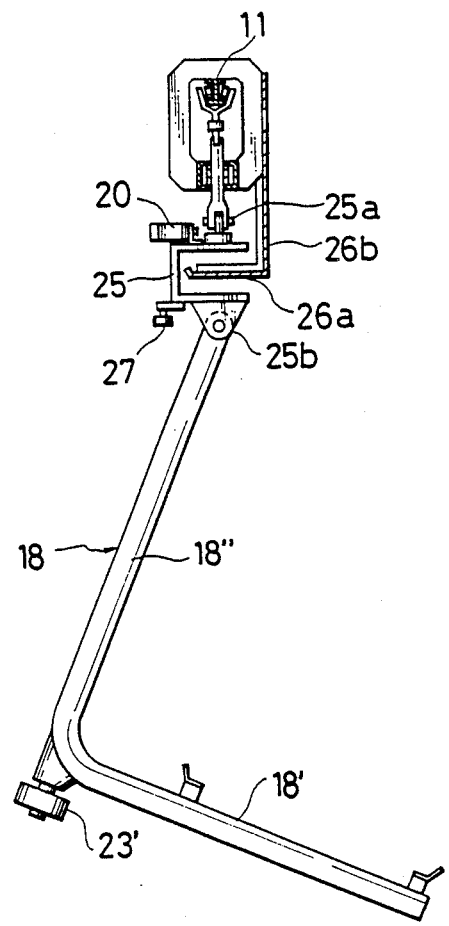
FIG. 8 is a side view of the hanger of FIG. 7 where there is no conveyed article thereon.

FIGS. 6 to 8 show a further embodiment of this invention. As before, the like numerals denote the like component parts, and explanation of such parts will be abbreviated.

At the center of the lower horizontal bar 19', and immediately below, (that is, at the lower end of) the vertical portion or arm 18" of the L-shaped hangers 18,18, a lower guide roller 23' is provided such that it can be guided by a lower guide rail 24'.

Moreover, at the lower side of the C-shaped fittings 25,25, upper guide rollers 27,27 are respectively provided at almost the same height as the hinge defining the second couplings 25b,25b. These upper guide rollers 27,27 are adapted to contact the inner surface of an upper guide rail 28 to prevent the L-shaped hangers 18,18 from tilting clockwise about the contact point of the lower guide roller 23' with the lower guide rail 24'.

The upper guide rail 28, which is U-shaped and upwardly opening, is connected to the wall 29. Said upper guide rail 28 also functions to receive dust which may be caused as the collector 20 slidingly moves along the feeding rail 22.

This embodiment facilitates transfer of the conveyed articles A to the hanger by means of a lifter, since the lower guide roller 23' is not provided at the load supporting portion 18' as was the case with the first embodiment.

Furthermore, the provision of a single lower guide roller 23' facilitates the change between the horizontal and tilting positions of the hanger when it enters into and leaves the tank 21, since the path of the guide roller 23' will be simple.

In addition, the provision of the upper guide rollers 27,27 and the guide rail 28 serves to stabilize the position of the second coupling 25b, thereby rendering the movement of the hanger 18 within the tank 21 more stable.

In this case, two upper guide rollers 27,27 and a single lower guide roller 23' make three-point contact with the upper guide rail 28 and lower guide rail 24', which ensures well stabilized conveyance.

Figure 1:
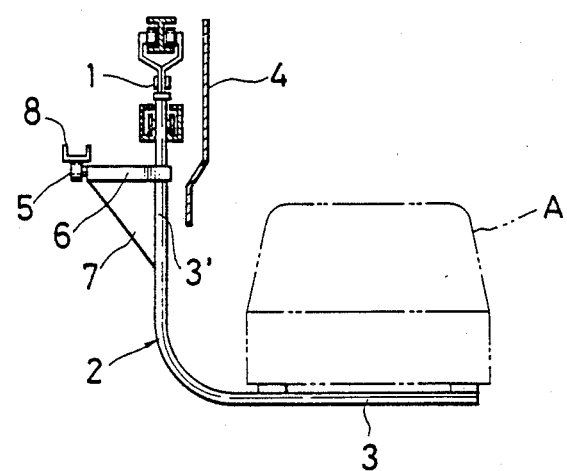
FIG. 1 is a side view of a prior art conveyor.
Figure 9:
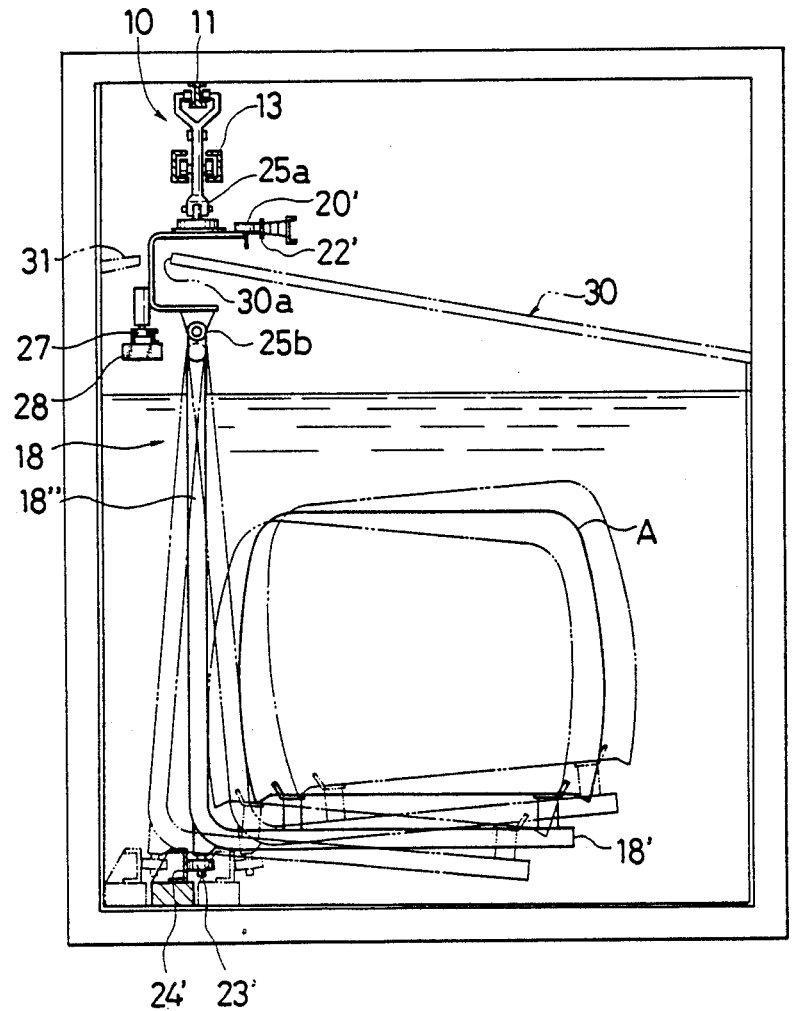
FIG. 9 is a side view similar to FIG. 7 but of still a further embodiment.

In the case of the conventional L-shaped hanger of FIG. 1, it has been incapable of swinging transversely, thereby requiring the guide rail 8 even in an empty hanger returning line. Thus, it has not been possible to branch out or converge lines. However, in the previous described embodiments of this invention, the L-shaped hangers may swing transversely, which makes it possible to abolish the guide rails in the empty hanger returning lines. Therefore, branching out and converging of lines can be easily carried out. FIG. 9 illustrates an embodiment in which the lower guide rail 24' as placed in the tank defines a zigzag line along the conveying direction. Thus, the L-shaped hanger 18 as it moves longitudinally through the tank 21 also swings sidewardly, thereby enabling air entrapped under the roof of the conveyed automotive body to be expelled. Thus, the pre-treatment electrodeposition may be more effectively carried out.

Moreover, FIG. 9 shows a modification of the foreign matter shielding means, which comprises inclined roof members 30 and 31 covering the surface of the bath in the tank. The tip 30a of the roof member 30 projects into the opening of the C-shaped fitting 25; and the roof member 31 projects adjacent the back of the fitting 25. In this case, a collector 20' and a feeding rail 22' are provided above the roof member 30. This modified structure serves to simplify the structure above the roof members; and maintenance of the overhead conveyor becomes easier.

Figure 10:
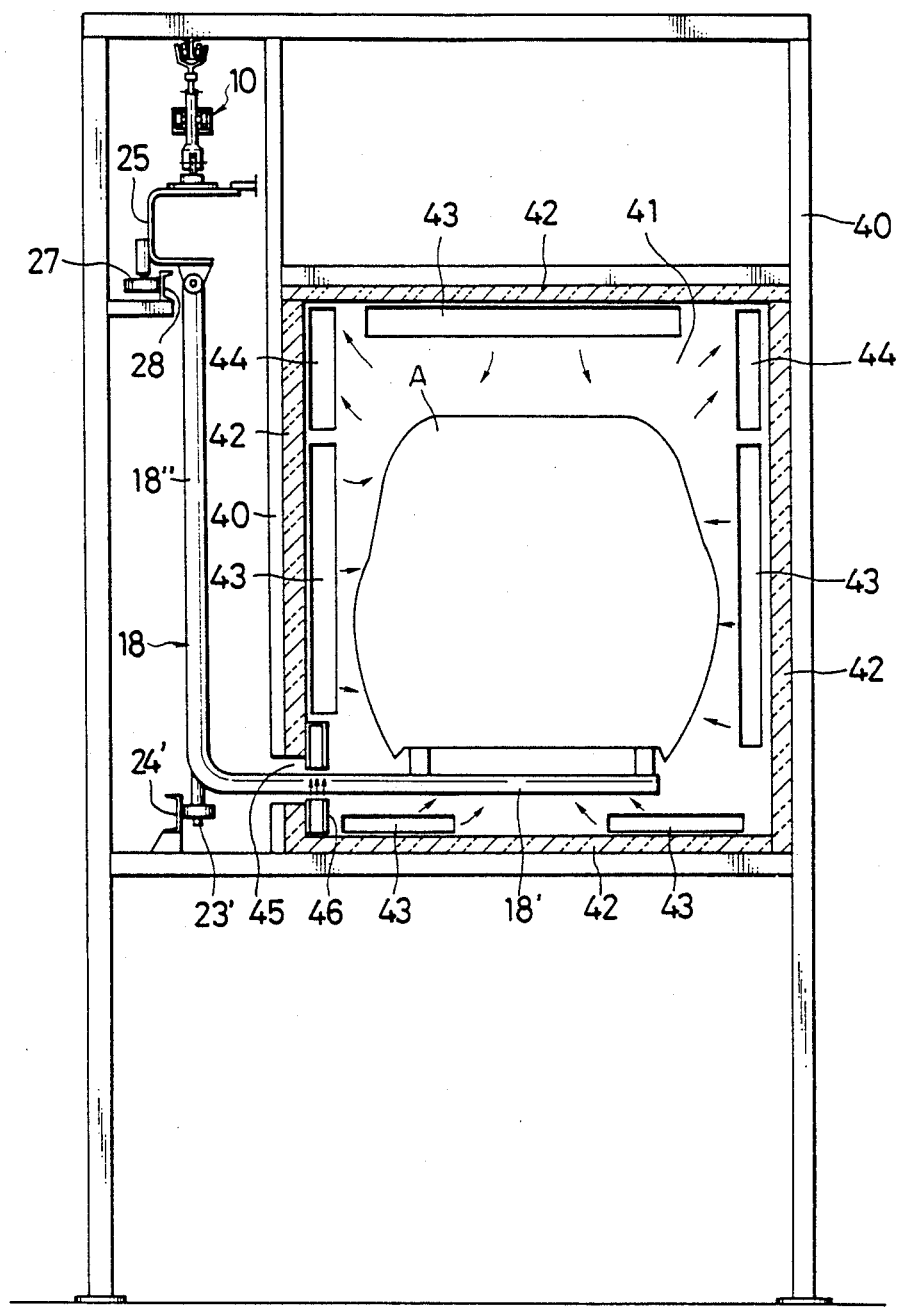
FIG. 10 is a side view partly in section of an application of this invention for conveying automotive bodies in a drying room after coating.

FIG. 10 depicts a possible application of the L-shaped hanger of the present invention. A frame 40 of a drying room 41 for automotive bodies A after coating is arranged such that it substantially encloses automotive bodies A. To the inner surfaces of the room 41, insulating material 42 is attached. Adjacent to the inner wall of the room 41, hot air inlets 43 and outlets 44 are provided. At the lower position of the room 41, a longitudinally elongated slit 45 is provided so that the proximal end of the load supporting portion 18' of the L-shaped hanger 18 may pass therethrough. The slit 45 may preferably be sealed by means of a known air curtain means 46.

According to this particular embodiment, the driving portion of the conveying apparatus may be completely separated from the severe atmosphere within the drying room. Consequently, possible corrosion of various mechanical parts, or degradation of lubricating oil, etc., due to such severe atmosphere may be positively prevented, and the maintenance work of the conveyor will be easy.

Alternatively, the room may be for coating or flushing of automotive bodies; then, the separation between the conveying apparatus and the room ensures that oil, dust etc., which may be caused by the conveyor will not be introduced into the room, which may affect the quality of such processing.

The room 41 as above mentioned may not necessarily be enclosed completely; a simple partition wall may be adequate so long as the atmosphere surrounding the conveyed articles and the conveying apparatus may be effectively separated.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A conveying apparatus for use in assembly line processing of articles supported thereon, comprising: conveying means supported for horizontal movement in a longitudinal direction of travel, support means for supporting said conveying means, a substantially L-shaped hanger having a pair of substantially perpendicular arms which are fixed to one another at adjacent ends thereof, said L-shaped hanger having one of said arms coupled at an upper free end thereof to said conveying means such that said L-shaped hanger depends downwardly from said conveying means with said one arm extending substantially vertically downwardly directly beneath said conveying means, and the other of said arms being cantilevered from said one arm and extending substantially horizontally but in a sideward direction which is substantially perpendicular to the longitudinal direction of travel of said conveying means for travel in said longitudinal direction, said one arm of said L-shaped hanger being pivotally coupled adjacent said free end thereof to said conveying means such that said L-shaped hanger is freely sidewardly swingable about said conveying means, said other arm terminating at a free end which is substantially sidewardly offset from said conveying means, said other arm being adapted to support an article thereon for travel in said longitudinal direction, said article, as supported on said other arm, being substantially horizontally sidewardly offset from said conveying means, said L-shaped hanger including a guide roller which is carried thereon and adapted for rolling engagement along a guide rail to provide roller support of said L-shaped hanger against sidewardly swinging movement as said hanger travels with said conveyor means.

2. The apparatus according to claim 1, wherein said one arm of said L-shaped hanger is coupled to said conveying means by a substantially C-shaped fitting, said C-shaped fitting opening generally sidewardly and having an upper part pivotally connected to said conveying means so as to be freely longitudinally swingable about said conveying means, said C-shaped fitting having a lower part spaced vertically below said upper part, said free end of said one arm being pivotally connected to said lower part of said C-shaped fitting such that said L-shaped hanger is freely sidewardly swingable about said C-shaped fitting.

3. The apparatus according to claim 2, wherein said C-shaped fitting opens sidewardly toward said other arm of said hanger, and wherein said support means includes shield means depending therefrom and vertically interposed between said upper and lower parts of said C-shaped fitting for preventing foreign objects from falling from said conveying means onto said L-shaped hanger and the article supported thereon.

4. The apparatus according to claim 3, wherein said shield means includes a platelike member having a vertically extending part, and a horizontally extending part attached to said vertically extending part, said horizontally extending part being vertically interposed between said upper and lower parts of said C-shaped fitting, and said vertically extending part disposed adjacent one side of said conveying means to isolate said conveying means from a region located above said other arm.

5. The apparatus according to claim 4, wherein said C-shaped coupling includes a further guide roller which projects therefrom and is adapted for rolling engagement along a guide rail to provide roller support for said L-shaped hanger, said further guide roller being vertically adjacent said lower part of said C-shaped fitting.

6. The apparatus according to claim 5, wherein said further guide roller is spaced slightly below said lower part of said C-shaped fitting and is rotatable about a vertical axis of rotation.

7. The apparatus according to claim 3, wherein said guide roller is carried on said hanger in the vicinity of said other arm and is rotatable about a vertical axis of rotation.

8. The apparatus according to claim 1, wherein there is defined an open region directly vertically above the other arm and above the article carried thereon, said region being disposed sidewardly horizontally adjacent said conveying means, and shield means disposed sidewardly adjacent and extending along said conveying means for sidewardly isolating said conveying means from said region.

9. A conveying apparatus, comprising: conveying means supported for horizontal movement in a longitudinal direction of travel, support means for supporting said conveying means, and a pair of longitudinally spaced, substantially L-shaped hangers each having a pair of substantially perpendicular arms which are fixed to one another at adjacent ends thereof, one said arm of each said L-shaped hanger being coupled at an upper free end thereof to said conveying means and depending substantially vertically downwardly therefrom, the other of said arms of each said L-shaped hanger being cantilevered from said one arm and extending substantially horizontally but in a sideward direction which is substantially perpendicular to the longitudinal direction of travel of said conveying means, each said L-shaped hanger being carried with said conveying means for travel in said longitudinal direction, said one arm of each said L-shaped hanger being pivotally coupled to said conveying means such that each said L-shaped hanger is freely sidewardly swingable about said conveying means, each said other arm terminating at a free end which is substantially sidewardly offset from said conveying means, each said L-shaped hanger being adapted to support an object on said other arm thereof for conveyance therewith, said object, as supported on said other arm, being substantially sidewardly offset from said conveying means, a longitudinally extending bar connected between said L-shaped hangers thereof, and a plurality of guide rollers adapted for rolling engagement with a guide rail to provide roller support for said L-shaped hangers, each said guide roller being rotatable about a vertical axis of rotation, a lower one of said guide rollers being carried on said longitudinally extending bar and located substantially midway between said L-shaped hangers, upper ones of said guide rollers being coupled to said conveying means and being carried adjacent but slightly sidewardly spaced from respective said free ends of said one arms, said lower guide roller being spaced substantially midway longitudinally between and substantially below said upper guide rollers.

10. An apparatus for simultaneously conveying and treating a workpiece, comprising:
conveying means supported for horizontal movement in a longitudinal direction of travel, support means for supporting said conveying means, a substantially L-shaped hanger having a pair of substantially perpendicular arms which are fixed to one another at adjacent ends thereof, said L-shaped hanger having one of said arms coupled at an upper free end thereof to said conveying means and depending substantially vertically downwardly therefrom, the other of said arms being cantilevered from said one arm and extending substantially horizontally but in a sideward direction which is substantially perpendicular to the longitudinal direction of travel of said conveying means, said L-shaped hanger being carried with said conveying means for travel in said longitudinal direction, said one arm being pivotally coupled to said conveying means such that said L-shaped hanger is freely sidewardly swingable about said conveying means, said other arm terminating in a free end which is substantially sidewardly offset from said conveying means, said L-shaped hanger being adapted to support the workpiece on said other arm for conveyance therewith, said workpiece, as supported on said other arm, being substantially sidewardly offset from said conveying means, means defining a chamber having a bottom wall and two sidewardly spaced upstanding side walls, said chamber being adapted to hold a fluid for use in treating the workpiece, said other arm of said hanger being received in said chamber with the workpiece supported thereon, said L-shaped hanger having a guide roller carried thereon, and a longitudinally extending guide rail supported stationarily relative to said hanger, said guide roller being engaged against said guide rail to provide roller support of said hanger against sidewardly swinging movement.

11. The apparatus according to claim 10, wherein said hanger is substantially completely vertically received in said chamber, said guide rail being located on said bottom wall of said chamber.

12. The apparatus according to claim 11, wherein said one arm of said hanger is coupled to said conveying means by a sidewardly opening, substantially C-shaped fitting having an upper part pivotally connected to said conveying means for freely swingable longitudinal movement about said conveying means, said C-shaped fitting having a lower part spaced vertically below said upper part, said one arm of said hanger being pivotally connected at said free end thereof to said lower part such that said hanger is freely sidewardly swingable about said C-shaped fitting, said C-shaped fitting having a further guide roller supported thereon, said chamber having a further longitudinally extending guide rail supported on one of said side walls, said further guide roller being engaged with said further guide rail to provide roller support for said hanger.

13. The apparatus according to claim 12, wherein said first-mentioned guide rail defines an alternatingly oppositely sidewardly directed zigzag pattern such that said hanger and the workpiece supported thereon swing reciprocally sidewardly as said first-mentioned guide roller travels longitudinally following said first-mentioned guide rail.

14. The apparatus according to claim 12, wherein said chamber includes a roof member supported on one of said side walls, said roof member extending sidewardly across said chamber above said hanger, a free end of said roof member being received in said C-shaped fitting vertically interposed between said upper and lower parts.

15. The apparatus according to claim 14, wherein said chamber includes a further roof member supported on one of said side walls and extending sidewardly across said chamber such that a free end of said further roof member is sidewardly adjacent said C-shaped fitting and said C-shaped fitting is interposed sidewardly between said free ends of said roof members.

16. The apparatus according to claim 15, wherein said first-mentioned guide rail defines an alternatingly oppositely sidewardly directed zigzag pattern such that said L-shaped hanger and the workpiece supported thereon swing reciprocally sidewardly as said first-mentioned guide roller travels longitudinally following said first-mentioned guide rail.

17. The apparatus according to claim 10, wherein said chamber includes means defining a longitudinally extending opening through one of said side walls, said other arm of said hanger being sidewardly received in said chamber through said opening, said conveying means, said support means, said guide roller and said guide rail all being located outside of said chamber.

18. The apparatus according to claim 17, wherein said chamber is completely enclosed except for said opening, said chamber having air curtain means disposed on said one side wall adjacent said opening for sealing said opening.

* * * * *

UNITED STATES PATENT AND TRADEMARK OFFICE
CERTIFICATE OF CORRECTION

PATENT NO. : 4 936 222

DATED : June 26, 1990

INVENTOR(S) : Masasumi MURAI

It is certified that error appears in the above-identified patent and that said Letters Patent is hereby corrected as shown below:

Column 5, line 42; after "said" insert ---conveying means, said L-shaped hanger being carried with said---.

Signed and Sealed this

Third Day of March, 1992

Attest:

HARRY F. MANBECK, JR.

*Attesting Officer*     *Commissioner of Patents and Trademarks*